United States Patent
Vajravel et al.

(10) Patent No.: US 9,952,992 B2
(45) Date of Patent: Apr. 24, 2018

(54) TRANSACTION REQUEST OPTIMIZATION FOR REDIRECTED USB DEVICES OVER A NETWORK

(71) Applicant: Dell Products L.P., Round Rock, TX (US)

(72) Inventors: Gokul Thiruchengode Vajravel, Bangalore (IN); Ramanujam Kaniyar Venkatesh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 202 days.

(21) Appl. No.: 14/813,252

(22) Filed: Jul. 30, 2015

(65) Prior Publication Data

US 2017/0031852 A1 Feb. 2, 2017

(51) Int. Cl.
*G06F 13/42* (2006.01)
*G06F 13/00* (2006.01)
*G06F 13/36* (2006.01)

(52) U.S. Cl.
CPC .......... *G06F 13/36* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 7,934,006 B2* | 4/2011 | Kato | ...... | G06F 21/33 709/227 |
| 8,799,900 B1* | 8/2014 | Kodorkin | ...... | H04N 5/262 718/1 |
| 2005/0086041 A1* | 4/2005 | Chrysanthakopoulos | | G06F 13/105 703/24 |
| 2008/0071962 A1* | 3/2008 | Yang | ...... | G06F 9/4411 710/313 |
| 2009/0094387 A1* | 4/2009 | Bunger | ...... | G06F 3/038 710/11 |
| 2011/0173351 A1* | 7/2011 | Aull | ...... | G06F 9/544 710/8 |
| 2013/0103380 A1* | 4/2013 | Brandstatter | ...... | G06F 9/45558 703/26 |
| 2015/0220467 A1* | 8/2015 | Jin | ...... | H04L 69/16 710/18 |
| 2016/0062940 A1* | 3/2016 | Cota-Robles | ...... | G06F 13/4221 710/313 |

* cited by examiner

*Primary Examiner* — Michael Sun
(74) *Attorney, Agent, or Firm* — Baker Botts L.L.P.

(57) ABSTRACT

In certain information handling system environments, physical devices connected to a client are redirected to a server or other information handling system. Each of these physical devices will use and occupy network bandwidth. Physical devices may be virtualized so that other users of remote systems may access and use the physical devices. Transaction requests associated with physical devices located at one or more client devices from applications may be reduced by determining if the transaction requests are certain types of commands, and if so then under certain conditions handling the transaction request at the server as opposed to transmitting all such transaction requests to the client device. Optimization of transaction requests associated with redirected devices provides efficiencies for a network.

20 Claims, 5 Drawing Sheets

TRANSACTION REQUEST OPTIMIZATION FOR REDIRECTED USB DEVICES OVER A NETWORK

TECHNICAL FIELD

This disclosure generally relates to remote computing and, in particular, relates to optimization of transaction requests, such as universal serial bus (USB) request blocks, for redirected USB devices over a network.

BACKGROUND

As the value and use of information continues to increase, individuals and businesses seek additional ways to process and store information. One option available to these users is an information handling system or computing system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems. The software components may comprise one or more modules that contain instructions that when executed perform one or more functions.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

Some information handling systems are designed to interact with other information handling systems over a network connection. In some instances, the information handling systems may share resources over the network. Certain of the networked information handling systems may act as servers, while others act as clients. In such systems, client applications and client devices may be designed so that the majority of the heavily used resources are at a shared information handling system, such as a centralized server. The client devices may have minimal memory, disk storage, and processor power. Use of such client devices may reduce the total cost of ownership because of the reduced use of resources at the client devices and because the clients can be centrally administered and updated from the server. Such client devices may be particularly well-suited for a network which can handle a significant number of devices.

Virtual desktop infrastructure (VDI) environments may include any one or more information handling systems. A virtual environment, such as a VDI, separates a desktop environment and its associated software in a data center or server, from the information handling system that is used to access the desktop environment. A "virtual desktop" may refer to any number of methodologies including server-based computing (SBC) where a number of users share the desktop of a server-based operating system, VDI where each user gets their own virtual machine which typically runs a client operating system, and application virtualization technologies that concentrate more closely on making specific applications available to users with these applications, for example, being hosted on a remote system or streamed to the user's local system. With respect to the virtual desktop technologies described, SBC is often regarded as being appropriate for task/call-center type environments, while VDI is more commonly deployed for knowledge workers who require a higher level of user personalization, and application virtualization technologies may be commonly deployed across SBC, VDI and physical desktop environments to solve business challenges such as legacy application OS compatibility.

Prior universal serial bus (USB) technology utilized in VDI environments emulated virtual USB hardware on a virtual USB bus driver on an information handling system, such as a server. The operating system of the server loaded a real driver and applications for the virtual USB hardware in the same way as such would be loaded for real physical hardware. When the application tried to access or use a virtual device or virtual hardware, the requests from the application would be translated as transaction requests (USB request blocks) directed to the virtual USB hardware on the server. The virtual USB bus driver redirected the USB request block (URB) transactions to another information handling system, such as a client, where the real physical hardware was actually located. The received transaction requests from the server were then submitted to the real USB hardware via a stub driver on the client. The resulting responses from the real USB hardware would then be transported back to the server and pumped to the virtual USB bus driver. The virtual USB bus driver then passed these responses back to the respective applications via the real driver, thus completing the loop.

One problem with the prior technology is that the virtual USB driver received a very large number of device probe transaction requests to check the status of the device, for example, whether the device was ready to transfer data. Such probes were in the form of URBs. These device probe URBs may consume huge network bandwidth and delay the accessibility of the USB device over the network, especially for a wide-area network (WAN). The present invention provides an efficient and cost-effective way to solve this problem.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DESCRIPTION

This disclosure generally relates to remote computing and, in particular, relates to optimization of transaction requests (universal serial bus (USB) request blocks (URB)) for redirected USB devices over a network, for example, a wide-area network (WAN) or a local area network (LAN).

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable storage media may include any instrumentality or aggregation of instrumentalities that may retain data and/or instructions for a period of time. Computer-readable storage media may include, for example without limitation, storage media such as a direct access storage device (for example, a hard disk drive or floppy disk), a sequential access storage device (for example, a tape disk drive), compact disk, compact disk read-only memory (CD-ROM), digital video disc (DVD), random access memory (RAM), ROM, electrically erasable programmable read-only memory (EEPROM), and/or flash memory.

As used herein, a "local" device of a system, or a device "locally" connected to a system, may be a device directly connected to the system using one or more wires or connectors (for example, physically connected to the system), a device indirectly connected to the system using one or more hubs, or a device directly connected to the system using a wireless link. Furthermore, in one aspect of the present disclosure, a local device of a system or a device locally connected to a system may include a device within the system (for example, an internal device).

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In systems based on the server/client model, certain resources may be shared amongst clients or between clients and servers via a network. For example, in one embodiment the network is a WAN or a LAN. In some circumstances, it may be advantageous to make peripheral devices connected locally at one client device available to one or more other information handling systems on the network.

One type of client information handling system may be a thin client, also known as a lean or slim client. A thin client is a computer or computer program which depends on some other computer, for example, a server, to fulfill at least some of the computational roles required of the thin client. In certain configurations of one or more information handling systems, multiple user may login to the same server. The users may be permitted to work simultaneously even though they may be physically located at separate locations. According to the present disclosure, the users may be permitted to simultaneously access data, applications, and/or hardware associated with the server (or other information handling system). The server itself may be a physical machine or a virtual machine (VM).

A user may access devices redirected to the server as if those devices are available locally to the user by connecting all the necessary peripherals. For example, the user may connect to universal serial bus (USB) printers, scanners, USB mass storage devices, and any other device known to one of ordinary skill in the art.

According to the present disclosure, individual interfaces associated with a single physical device may be installed locally or may be redirected to another information handling device, such as a server. Interfaces forwarded to the server may be mounted as virtual devices at the server and may be shared with additional information handling systems. In some embodiments, one interface associated with a composite device may be redirected to one server, a second interface may be redirected to a second server, and a third interface may be installed locally.

As an example, if a USB printer/scanner were connected to a given client via a standard USB connection, the locally connected USB printer/scanner may be redirected to the server. The scanner may then be installed locally for use by any number of clients. The server treats the USB printer/scanner as a virtual device attached to the server. Alternatively, the USB printer interface or component could be redirected to one server and the USB scanner interface or component could be redirected to a second server.

Figure 1:
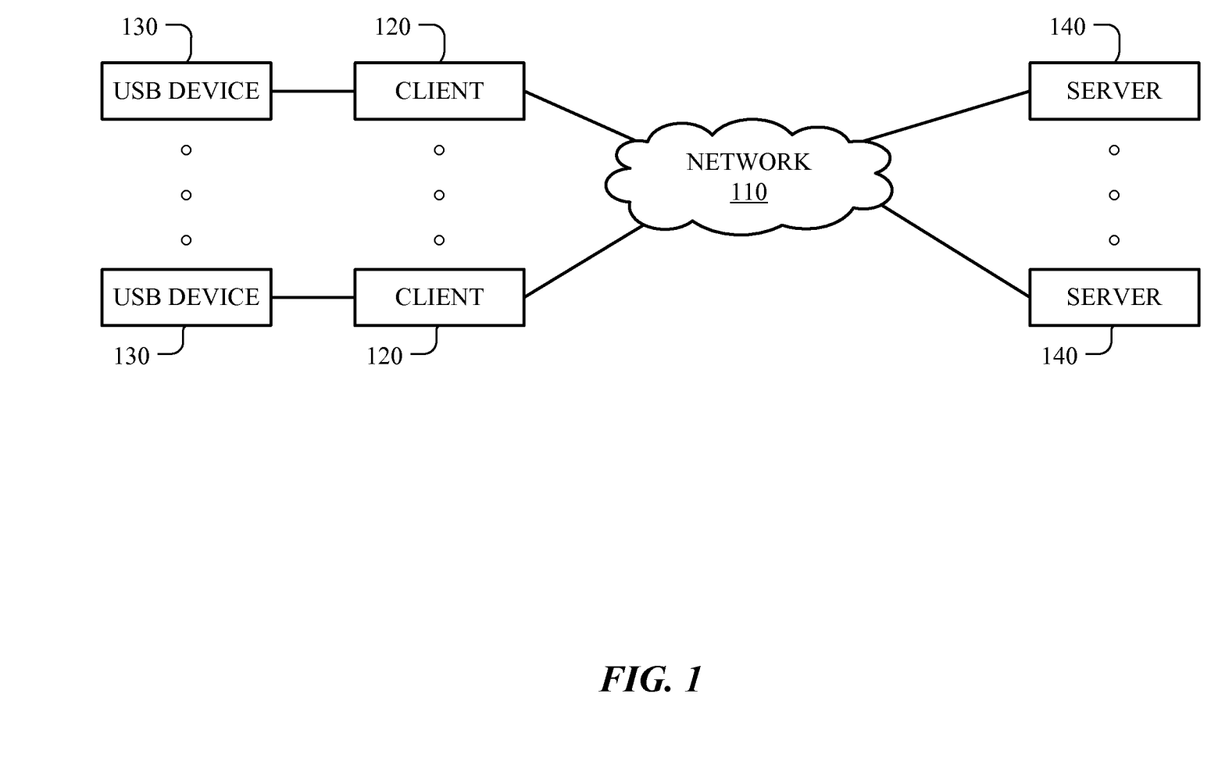
FIG. 1 illustrates an example configuration of networked information handling systems according to one embodiment of the present disclosure.

FIG. 1 illustrates an example configuration of a networked information handling system. In particular embodiments, one or more client devices 120 and one or more servers 140 are connected via network 110. Many types of peripheral devices may be connected locally to the client devices 120. As shown in FIG. 1, in some embodiments, one or more USB devices 130 connect to the client devices 120. According to the present disclosure, one or more USB devices 130 may appear to one or more of servers 140 as if they are locally installed on and connected to those servers 140. In certain embodiments, these USB devices 130 may be redirected such that they appear to be locally installed or locally shared with another client device 120. In one or more embodiments, one or more interfaces of one or more USB devices 130 may appear to one or more servers 140 as if they are locally installed on and connected to those servers 140, while other interfaces associated with USB devices 130 may be locally installed on their respective client devices 120. In some cases, interfaces associated with a USB device 130 on one client device 120 may be redirected such that it appears to be locally installed or remotely shared with another client device 120.

Figure 2:
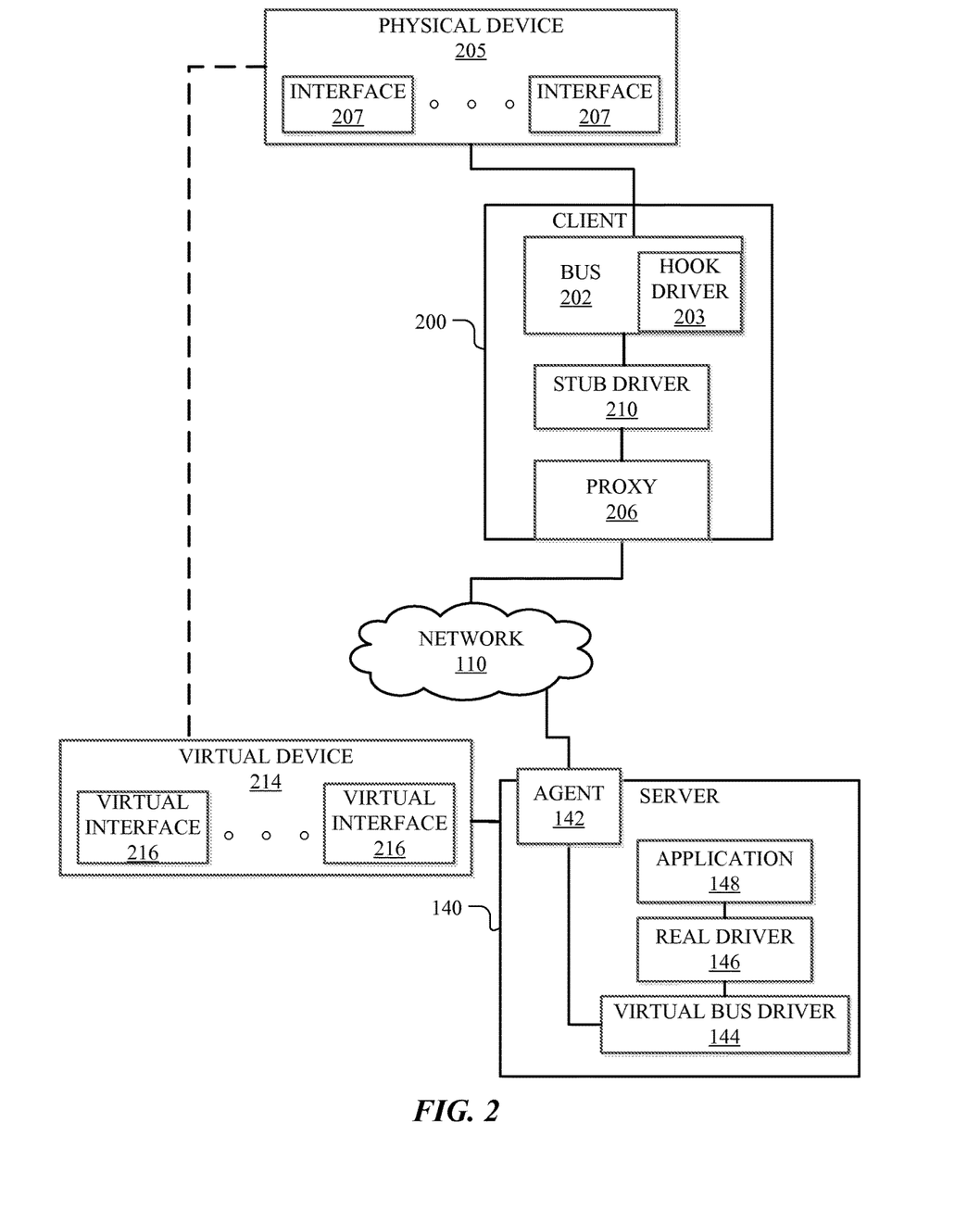
FIG. 2 illustrates an example system of a networked client and server that supports optimization for redirected devices according to one embodiment of the present disclosure.

FIG. 2 illustrates an example embodiment of a system configured to redirect a physical device 205, for example, a USB device. In a particular embodiment, the configuration shown in FIG. 2 illustrates a virtual environment that may include one or more of Virtual Desktop Infrastructure (VDI) environment, Server-Based Computing (SBC) environment, and application virtualization technologies. This disclosure contemplates any number of virtual environments as known to one of ordinary skill in the art. As a result of the suitability of these technologies for different user types, many organizations are choosing to implement a hybrid approach that uses each of the technologies including using multiple vendors within each technology. The decision as to which users to allocate to which technology type may be difficult in advance of any actual implementation of a particular technology for a particular user.

In particular embodiments, client 200 connects to server 140 via network 110. Client 200 recognizes physical device 205, which is connected locally. Physical device 205 may have one or more interfaces 207. When physical device 205 is initially connected to client 200, client 200 may attempt to initialize physical device 205 by attempting to load a driver. According to the present disclosure, client 200 may determine (or may permit a user to determine) whether to redirect physical device 205 or to redirect one or more interfaces 207 associated with physical device 205 upon connection of the physical device 205, as part of the initialization of physical device 205. In particular embodiments, client 200 may make a new determination regarding the installation of physical device 205 after physical device 205 has been initialized. For example, a user may decide that the physical device 205 or an interface 207 of physical device 205 that was previously installed on its local client 200 should be redirected to server 140.

In the example embodiment shown in FIG. 2, a redirection hook driver 203 hooks a bus 202 associated with the operating system running on client 200. Hook driver 203 may interrupt the automatic operation of the operating system, since the operating system may be configured to automatically identify a driver for composite device 205 and attempt to install composite device 205 locally. In particular embodiments, hook driver 203 may change a device identifier associated with physical device 205.

The devices associated with interfaces 207 may be composite devices. In such cases, the virtual devices will be identified as composite devices, but may have fewer interfaces 207 associated with them than the total number of interfaces associated with physical composite device 205. For example, a first device may be identified as a USB printer/scanner composite device, but the virtual device may only have a single interface 207, such as the printer interface. A second device may be created (likewise identified as a composite device) for the scanner interface.

Client 200 may be configured to automatically install all or only certain physical devices 205 or interfaces 207 locally, may be configured to automatically redirect all or certain physical devices 205 or interfaces 207 to server 140, or may be configured to request input from a user of client 200 or from another source to determine whether to install a particular physical device 205 or interface locally or to redirect it. Certain physical devices, such as hubs, may also be precluded from redirection.

If a physical device 205 or an interface 207 is configured to be redirected to server 140, the redirection may operate generally as described in U.S. Pat. No. 8,010,630 to Barreto, et al., which is incorporated herein by reference. A proxy module 206 on client 200 may coordinate communications between composite device 205 and an agent 142 running on server 140. In particular, proxy 206 may be configured to receive socket connection information from server 140 and initiate redirecting device transactions to and from composite device 205 to agent 142 on server 140.

Agent 142 may be configured to register with the operating system of server 140 to receive notification of an establishment of a remote access connection between virtual device 214 and server 140. When agent 142 receives the notification, it can determine what devices have connected to server 140 and when they connected, and can thus determine when and from where the local device redirection is to be initiated.

Virtual bus driver 144 receives information about redirected physical device 205 or interface 207 from agent 142. Virtual bus driver 144 then calls device driver 146 associated with physical device 205 or interface 207, which completes the initialization of the virtual device 205 on server 140. The virtual device 214 associated with redirected physical device 205 or redirected interface 207 then functions as if the redirected physical device 205 or the redirected interface 207 of physical device 205 were locally connected to server 140 (as indicated by the dashed line between physical device 205 and virtual device 214). The virtual device 214 associated or the virtual interface 216 associated with redirected interface 207 may thus be made available to application 148 running on server 140, which can treat the virtual device 214 or the virtual interface 216 as a local device or local interface, respectively.

In order for an interface 207 to work properly as a virtual device, it may be necessary under some operating systems to instruct the operating system that the virtual device does not include all interfaces 207 associated with physical device 205. This may be unnecessary in certain circumstances when the virtual device is presented as a physical device, but may be preferable to specifically instruct the operating system in this manner at least when the virtual device is identified as single non-composite device.

The application 148 may make requests to access one or more virtual devices 214. These requests are translated as transaction requests or URBs directed to the virtual USB device 214 at the server 140. The virtual USB driver 144 redirects the URBs to the client device 200 where the associated physical device 205 is located. These requests from the server 140 are transmitted to the associated physical device 205 via a stub driver 210. The responses from the associated physical device 205 are transmitted back to the server 140 and pumped to the virtual USB bus driver 144.

The virtual USB bus driver 144 passes the responses back to the respective applications 148 via the real driver 146.

Figure 3:
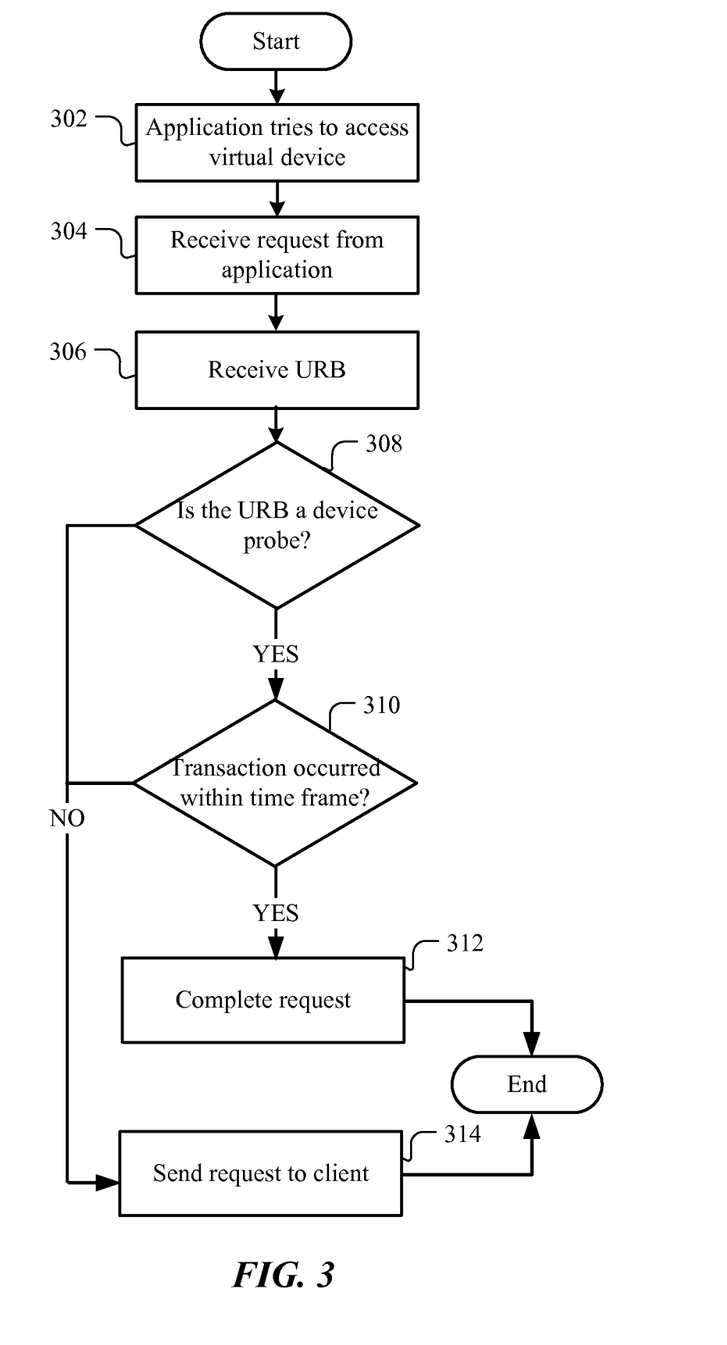
FIG. 3 illustrates an example of steps involved in one method of transaction request optimization for redirected device according to one embodiment of the present invention.

FIG. 3 is a flow chart in accordance with an embodiment of the present disclosure relating to transaction request (for example URBs) optimization for redirected USB devices over a network. In one embodiment, a USB physical device 205 may be a USB hard drive, USB thumb drive or any other USB storage device known to one of ordinary skill in the art. The client 200 may redirect the USB physical device 205 to a server 140. Before application 148 may access the virtualized device, virtual device 214, the server 140 may determine whether the virtual device 214 is accessible. In one embodiment, the virtual device 214 is a redirected USB hard drive. A USB hard drive may not be accessible at all times. For example, the USB hard drive may have certain states that do not permit any read and/or write commands to be processed. Prior technology would send test unit ready commands or device probes to the client 200 each time a server 140 needed to determine whether a physical device 205 associated with a virtual device 216 was accessible. The present invention provides a system and method for optimizing such requests such that the amount of network traffic between the server 140 and client 200 is minimized.

In one embodiment, at step 302, an application 148 at server 140 tries to access a virtual device 214. Any one or more applications 148 may try to access any one or more virtual devices 214. In one embodiment, the virtual device 214 is a mass storage device. For example, virtual device 214 may be a USB thumb drive, a USB hard disk drive or any other USB storage device known to one of ordinary skill in the art that can be coupled to the server 140 via a USB.

At step 304, the real driver 146, associated with the virtual device 214 that the application 148 is attempting to access, receives the request to access the virtual device 214 from application 148. The request from application 148 is translated by the real driver 146 into a transaction request, or a URB. In one embodiment, the real driver 146 may translate a test unit ready command into a URB that corresponds to virtual device 214. The real driver 146 knows what type of command is necessary to determine whether a particular virtual device 214 is ready to read and/or write data or not such that the particular virtual device 214 may be accessed. Accessing a virtual device 214 may include writing to or reading from or any other type of accessing known to one of ordinary skill in the art. The operating system of the server 140 loads the real driver 146 for virtual device 214 in the same manner it would if the virtual device 214 was a real locally connected physical device.

At step 306, the virtual bus driver 144 receives the URB from the real driver 146. The virtual bus driver 144 then determines at step 308 if the URB is a test unit ready command or a device probe. That is, the virtual bus driver 144 determines whether an attempt is being made to determine the status (for example, ready to read and/or write data) of the virtual device 214. If the URB is a device probe then at step 310 the virtual device 214 determines if a transaction to and/or from the virtual device has occurred within a time frame without any errors. The transaction may be any type of transaction including a device probe from a previously received URB, a read command, a write command, or any other type of transaction or command known to one of ordinary skill in the art. The time frame may be a predetermined time period. In one embodiment, the time period may be less than or equal to thirty seconds. In another embodiment, the time period may be set by a user with the setting stored in memory 604 or storage 606 of FIG. 6 or any other location known to one of ordinary skill in the art. In yet another embodiment, the time period may be based, at least in part, on the type of or one or more characteristics of virtual device 114.

At step 312, if the transaction has occurred within a time frame, the request by application 148 is completed. The virtual bus driver 144 will send a status to the real driver 146 that indicates that the virtual device 214 may be ready to read and/or write data. The real driver 146 will send the status of the virtual device 214 to the application 148. In one embodiment, the request received from application 148 is a read or write command. The real driver 146 after receiving the status of the virtual device 214 (for example, ready to read and/or write) from virtual bus driver 144 will proceed with sending the command to the virtual bus driver 144 for processing by the virtual device 214. That is, the virtual bus driver 144 will send the command to the agent 142 which transmits the command via network 110 to the proxy 206 of the client device 200 where the command is eventually processed by the physical device 205.

Figure 5:
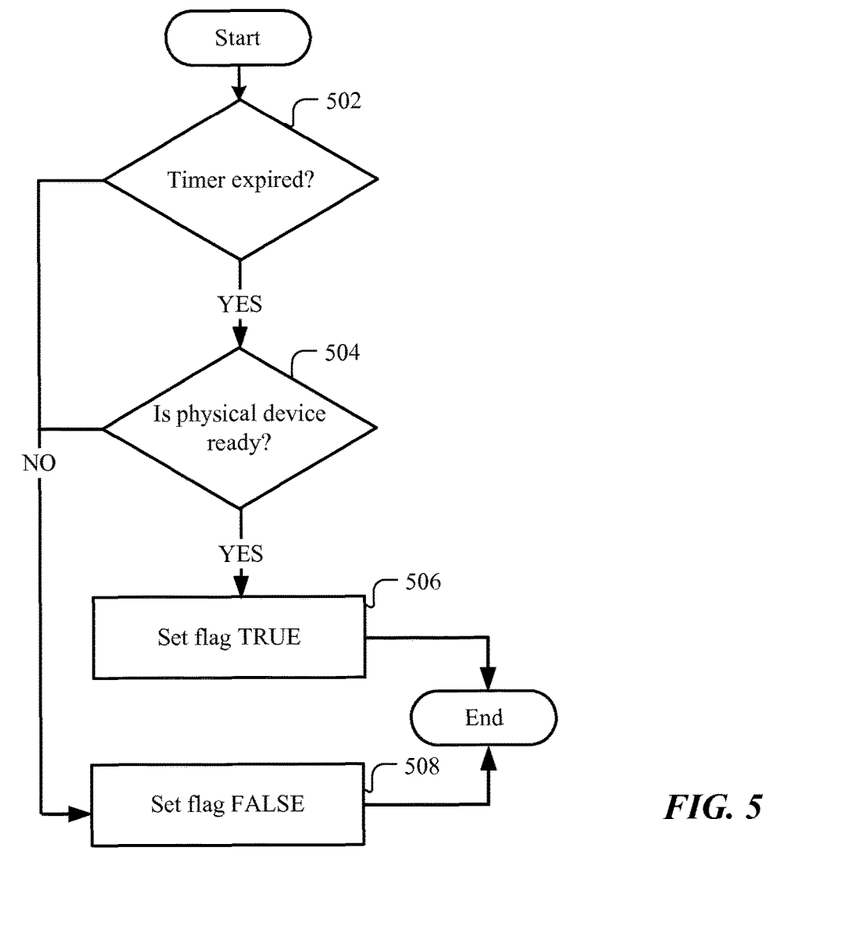
FIG. 5 illustrates an example of steps involved in one method according to the present invention.
Figure 6:
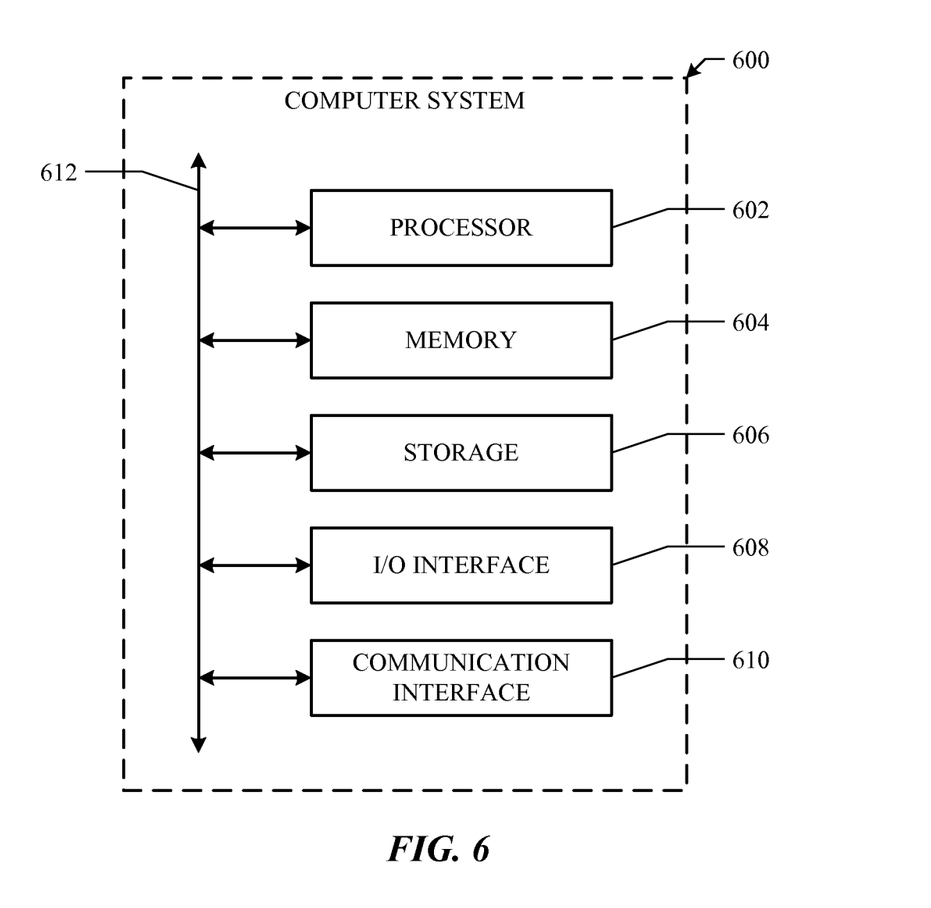
FIG. 6 illustrates an example computing system.

If at step 308 it is determined that the URB is not a device probe, the request (or command) is sent to the physical device 205 via the client 200 as described above. If at step 310, a transaction has not occurred within a time frame, the URB is translated by the virtual bus driver 144 and is redirected to the client 200 where the request is sent to the physical device 205 as described above. While step 310 in FIG. 3 occurs after a request from application 148, the present disclosure contemplates that step 310 may occur at any time. That is, it may be determined at any time that a physical device 205 is accessible to an application 148 even before the application 148 tries to access the virtual device 214. For example, as illustrated in FIG. 5, at step 502 it may be determined that a timer has expired. The timer may be initialized and function in accordance with any known timer to one of ordinary skill in the art. The timer interval may be set by a user or may be based, at least in part, on the type of or characteristics of the physical device 205 or based on any other criteria known to one of ordinary skill in the art. The timer may generate an interrupt, set a flag, or modify/initiate any other indicator known to one of ordinary skill in the art such that it is determined at step 504 if the physical device 205 is available for accessing by any one or more applications 148. If it is determined that the physical device 205 is accessible then a flag may be set to TRUE at step 506 while if the physical device is not accessible then a flag may be set to FALSE at step 508. The flag may be stored in memory 604 or storage 606 as illustrated in FIG. 6 or any other storage location known to one of ordinary skill in the art.

Figure 4:
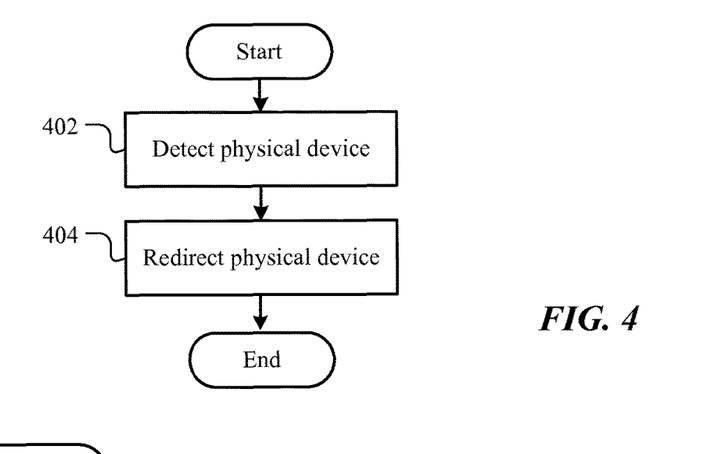
FIG. 4 illustrates an example of steps involved in one method according to the present invention.

FIG. 4 is a flow chart in accordance with one embodiment of the present invention. At step 402, the client device 200 detects that a physical device 205 has been connected. The connection may be a physical connection, a wireless connection, or any other connection known to one of ordinary skill in the art. At step 404, the client redirects the physical device 205 to the server 140 such that the server 140 now sees the physical device 205 as virtual device 214. The virtual device 214 is now accessible by the server 140 as if the physical device 205 was local to the server 140.

By handling certain transaction requests at the server 140 several advantages are realized. For example, reduced network bandwidth consumption of redirected physical devices is realized as less traffic is transmitted over the network. An improvement in the accessibility of redirected physical devices over the network is realized. The Windows operating system continuously checks to determine if an attached device is ready to read and/or write data. These frequent status checks have to be transmitted from a server to a client and back again which consumes bandwidth. In a high latency network, this will cause a delay. By reducing these network transfers, the accessibility to the device is improved as well as a reduction in network bandwidth consumption. Also, server scalability is improved by allowing the server to service a greater number of redirected physical devices. In one embodiment, one or more described optimizations are implemented in the Dell Wyse TCX USB Virtualization. It is contemplated that the present invention may be extended to other redirection technologies, for example, Microsoft, CITRIX, VMWARE, and others known to one of ordinary skill in the art.

Although some of the embodiments disclosed herein are described with reference to composite devices connected via universal serial bus, it should be understood that composite devices may be connected to information handling systems in any number of ways. As examples, a composite device may be connected via IEEE 1394, SATA, SCSI, Ethernet, PCI, PCIe, ISA, AGP, HDMI, DisplayPort, or other connection. In addition, a composite device may be connected wirelessly, including via wireless USB or Bluetooth.

Particular embodiments may be implemented on one or more electronic devices or information handling systems. FIG. 6 illustrates an example information handling system, computer system 600. For example, computer system 600 may be an embodiment for a device that runs a user interface content editor. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. The instructions may be part of one or more modules. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The concepts disclosed in this application should not be understood to be limited to the exemplary embodiments described herein, but should be understood to encompass all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
receiving, at a first server, a first request from a first application to access a first virtual device associated with the first server, wherein the first virtual device emulates a universal serial bus (USB) physical device associated with a first client;
receiving at a first real driver the first request, wherein the first real driver is associated with the first virtual device;
translating the first request to a first universal serial bus request block (URB);
determining if the URB is a device probe command;
determining, based on the determination if the URB is the device probe command, if a successful transaction request has occurred within a time period; and
completing the first request at the server based on the determination if the successful transaction request has occurred within the time period, wherein completing the request at the server comprises responding to the first URB by a first virtual driver bus.

2. The method of claim 1, wherein the first virtual device is one of a USB hard drive or USB thumb drive.

3. The method of claim 1, wherein the first request is a test unit ready command.

4. The method of claim 1, wherein the first request is one of a read command or a write command.

5. The method of claim 1, further comprising:
sending, by the first virtual bus driver, a status of the first virtual device to the first real driver.

6. The method of claim 1, wherein the time period is a predetermined time period.

7. The method of claim 1, wherein the time period is set by a user.

8. A system comprising:
a first server;
one or more central processing units for processing information of the first server;
a memory of the first server communicatively coupled to the one or more central processing units; and
one or more modules that comprise instructions stored in the memory, the instructions, when executed by the one or more processing units, operable to perform operations comprising:
receiving, at a first server, a first request from a first application to access a first virtual device associated with the first server, wherein the first virtual device emulates a universal serial bus (USB) physical device associated with a first client;
receiving at a first real driver the first request, wherein the first real driver is associated with the first virtual device;
translating the first request to a first universal serial bus request block (URB);
determining if the URB is a device probe command;
determining, based on the determination if the URB is the device probe command, if a successful transaction request has occurred within a time period; and
completing the first request at the server based on the determination if the successful transaction request has occurred within the time period, wherein completing the request at the server comprises responding to the first URB by a first virtual driver bus.

9. The system of claim 8, wherein the first virtual device is one of a USB hard drive or USB thumb drive.

10. The system of claim 8, wherein the first request is a test unit ready command.

11. The system of claim 8, wherein the first request is one of a read command or a write command.

12. The system of claim 8, wherein the instructions further operable to perform operations comprising:
sending, by the first virtual bus driver, a status of the first virtual device to the first real driver.

13. The system of claim 12, wherein the time period is a predetermined time period.

14. The system of claim 12, wherein the time period is set by a user.

15. A computer-readable non-transitory storage medium embodying software operable when executed by one or more computer systems to:
receive, at a first server, a first request from a first application to access a first virtual device associated with the first server, wherein the first virtual device emulates a universal serial bus (USB) physical device associated with a first client;
receive at a first real driver the first request, wherein the first real driver is associated with the first virtual device;
translate the first request to a first universal serial bus request block (URB);
determine if the URB is a device probe command;
determine, based on the determination if the URB is the device probe command, if a successful transaction request has occurred within a time period; and
complete the first request at the server based on the determination if the successful transaction request has occurred within the time period, wherein completing the request at the server comprises responding to the first URB by a first virtual driver bus.

16. The medium of claim 15, wherein the first virtual device is one of a USB hard drive or USB thumb drive.

17. The medium of claim 15, wherein the first request is a test unit ready command.

18. The medium of claim 15, wherein the first request is one of a read command or a write command.

19. The medium of claim 15, wherein the software is further operable when executed to:
send, by the first virtual bus driver, a status of the first virtual device to the first real driver.

20. The medium of claim 15, wherein the time period is a predetermined time period.

* * * * *